(12) United States Patent
Padwick

(10) Patent No.: US 8,913,826 B2
(45) Date of Patent: Dec. 16, 2014

(54) ADVANCED CLOUD COVER ASSESSMENT FOR PANCHROMATIC IMAGES

(71) Applicant: DigitalGlobe, Inc., Longmont, CO (US)

(72) Inventor: Chris Padwick, Longmont, CO (US)

(73) Assignee: DigitalGlobe, Inc., Longmont, CO (US)

( * ) Notice: Subject to any disclaimer, the term of this patent is extended or adjusted under 35 U.S.C. 154(b) by 0 days.

(21) Appl. No.: 13/955,429

(22) Filed: Jul. 31, 2013

(65) Prior Publication Data

US 2014/0029844 A1 Jan. 30, 2014

Related U.S. Application Data

(63) Continuation of application No. 13/112,583, filed on May 20, 2011, now Pat. No. 8,594,375.

(60) Provisional application No. 61/346,567, filed on May 20, 2010.

(51) Int. Cl.
*G06K 9/00* (2006.01)
*G06K 9/46* (2006.01)

(52) U.S. Cl.
CPC ............ *G06K 9/4652* (2013.01); *G06K 9/0063* (2013.01)
USPC .......................................... 382/165

(58) Field of Classification Search
None
See application file for complete search history.

(56) References Cited

U.S. PATENT DOCUMENTS

| | | | | |
|---|---|---|---|---|
| 4,984,279 A * | 1/1991 | Kidney et al. | ................. | 382/113 |
| 5,255,190 A * | 10/1993 | Sznaider | ............................ | 702/3 |
| 5,612,901 A * | 3/1997 | Gallegos et al. | ................... | 702/3 |
| 6,937,774 B1 * | 8/2005 | Specht et al. | ................ | 382/254 |
| 6,990,410 B2 | 1/2006 | Boright et al. | | |
| 7,356,201 B2 * | 4/2008 | Gunther et al. | .............. | 382/294 |
| 7,480,052 B1 * | 1/2009 | Roskovensky | ................ | 356/437 |
| 8,116,522 B1 * | 2/2012 | Buck et al. | ..................... | 382/103 |
| 8,170,282 B1 * | 5/2012 | Roskovensky | ................ | 382/103 |
| 8,184,865 B2 * | 5/2012 | Sasakawa | ..................... | 382/113 |
| 8,478,067 B2 * | 7/2013 | Riley et al. | ..................... | 382/276 |
| 2004/0264796 A1 * | 12/2004 | Turner et al. | ................... | 382/254 |
| 2005/0114026 A1 * | 5/2005 | Boright et al. | ..................... | 702/3 |
| 2005/0114027 A1 * | 5/2005 | Boright et al. | ..................... | 702/3 |
| 2005/0123191 A1 * | 6/2005 | Zhang et al. | ................. | 382/154 |
| 2005/0163366 A1 * | 7/2005 | Zhang et al. | ................. | 382/154 |
| 2005/0175253 A1 * | 8/2005 | Li et al. | .......................... | 382/260 |
| 2005/0195096 A1 * | 9/2005 | Ward et al. | .............. | 340/995.14 |
| 2007/0186830 A1 * | 8/2007 | Fraisse et al. | ................. | 111/200 |
| 2007/0282560 A1 * | 12/2007 | Anderson | ..................... | 702/127 |
| 2008/0063237 A1 * | 3/2008 | Rubenstein | .................... | 382/103 |
| 2008/0136839 A1 * | 6/2008 | Franko et al. | ................ | 345/634 |
| 2009/0167596 A1 * | 7/2009 | Costes et al. | ................ | 342/25 A |
| 2010/0189363 A1 * | 7/2010 | Riley et al. | ..................... | 382/209 |
| 2011/0064280 A1 * | 3/2011 | Sasakawa | ..................... | 382/113 |

* cited by examiner

*Primary Examiner* — Shervin Nakhjavan
(74) *Attorney, Agent, or Firm* — Robert G. Crouch; Marsh Fischmann & Breyfogle LLP

(57) ABSTRACT

Cloud cover assessment system and method provides for automatically determining whether a target digital image acquired from remote sensing platforms is substantially cloud-free. The target image is acquired and compared to a corresponding known cloud-free image from a cloud-free database, using an optimized feature matching process. A feature matching statistic is computed between pixels in the target image and pixels in the cloud-free image and each value is converted to a feature matching probability. Features in the target image that match features in the cloud-free image exhibit a high value of feature matching probability, and are considered unlikely to be obscured by clouds, and may be designated for inclusion in the cloud-free database.

33 Claims, 10 Drawing Sheets

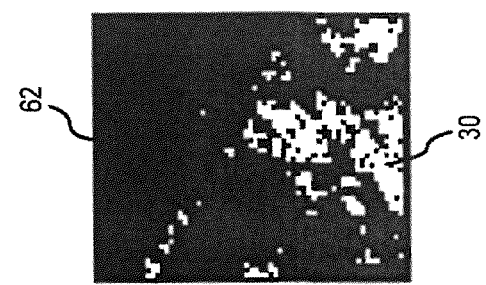
FIG.7A FIG.7B

ADVANCED CLOUD COVER ASSESSMENT FOR PANCHROMATIC IMAGES

CROSS-REFERENCE TO RELATED APPLICATION

This application is a continuation of U.S. application Ser. No. 13/112,583, filed May 20, 2011, which claims the benefit of provisional Application No. 61/346,567, filed May 20, 2010, both of which are incorporated herein by reference for all that they disclose.

FIELD OF THE INVENTION

Embodiments generally relate to image processing, and more specifically to the automated detection and delineation of cloudy pixels in images of the Earth collected by high altitude or orbital overhead imaging sensors.

BACKGROUND OF THE INVENTION

Commercial remote sensing companies build and launch satellites that collect images of the Earth (sometimes referred to herein as "Earth Imaging" satellites). Often, a company will operate multiple satellites that collect digital images in a variety of spectral bands or channels. Sensors that collect radiation in a small, distinct number of separate spectral channels with narrow spectral band passes are called multispectral instruments. In layman's terms, such imagery is referred to as color imagery. Sensors that collect radiation in a single spectral channel with a broadly defined spectral band pass are referred to as panchromatic or sometimes Electro-Optical (EO) imagery. In layman's terms, such imagery is referred to as "black and white."

The images are collected by the satellites, down-linked to a ground station, and processed to create geographically-referenced digital imagery. The resulting imagery is sold to customers who desire the imagery for a variety of purposes, from commercial web applications and sophisticated mapping applications, to image mining, classification and understanding. In many cases, the customer may be interested in non-cloudy pixels in the imagery, since the presence of clouds obscures the features of interest on the ground. Thus, cloudy pixels are often viewed as a defect in the imagery.

In practice, often only part of a given image will be obscured by clouds while another part of the image may be completely cloud-free. Thus, the cloud-free part of the image (e.g., cloud-free pixels) may be used to fulfill all or part of a customer's order and represents commercially valuable pixels. In contrast, pixels obscured by clouds, or cloudy pixels, are of limited utility for geographically-referenced digital imagery. In this situation, the remote sensing company spends considerable time and money either delineating the cloud locations in the imagery manually, investing in a system to detect clouds automatically in imagery, or performing a combination of both automated and manual processing.

To date, known functional cloud detection techniques focus on exploiting spectral characteristics of the collected imagery to detect the presence of cloudy pixels. In many cases, the techniques require spectral measurements in different spectral channels, or bands, of a variety of wavelengths to operate, and have a relatively narrow associated bandpass for the spectral channels. Current known techniques are now discussed in more detail.

In U.S. Pat. No. 6,990,410, entitled "Cloud Cover Assessment: VNIR-SWIR" A. Boright describes a technique for classifying cloudy pixels using spectral information from a sensor designed to measure reflected solar energy in the 1.88 micrometer and 1.38 micrometer wavelength spectral bands. The following general process is utilized in the '410 patent:

- a first comparison of the cirrus band reflectance with a cirrus band reflectance threshold is performed;
- a second comparison of a normalized difference snow index with a threshold is performed;
- a third comparison of a "D" variable with a threshold is performed;
- a fourth comparison of a "D" spatial variability index with a threshold is performed;
- a fifth comparison of the ratio of near infrared to SWIR ratio with a threshold that may be determined empirically is performed.

In various embodiments disclosed in the '410 patent, the cirrus band wavelengths are approximately 1.88 micrometers and 1.38 micrometers. The '410 patent defines a normalized difference snow index (NDSI) as $(\rho_{green}-\rho_{SWIR1})/(\rho_{green}+\rho_{SWIR1})$, the D variable is defined as $NDVI^{0.6}/(\rho_{red})^2$ and a normalized difference vegetation index (NDVI) as $=(\rho_{red}-\rho_{NIR})/(\rho_{red}+\rho_{NIR})$. The spatial variability index is defined as $D_m-D_c$ where $D_m$ is the mean of at least a 3×3 matrix of data points, where $D_c$ is the central pixel in the matrix. Thus, the spectral classification technique of several embodiments disclosed in the '410 patent may be said to rely on the presence of spectral bands at both 1.88 micrometers and 1.38 micrometers and a red spectral band for the technique to work.

In U.S. Pat. No. 5,612,901, entitled "Apparatus and Method For Cloud Masking", S. Gallegos describes a method and apparatus for detecting and masking cloud pixels over a body of water for an image collected by the AHVRR instrument. The AVHRR instrument operates at 1 km resolution. The method disclosed in the '901 patent generally operates as follows:

Using the well-known gray level co-occurrence (GLC) metric to compute a "cluster shade image" from the image measured by collecting spectral information in channel 1, operating at 585-685 nanometers (nm) for daytime collections. For nighttime collections channels 3, 4, and 5 operating at 3,575-3,983 nm, 10,362-11,299 nm, and 11,450-12,424 nm respectively are used to generate the cluster shade image.

Generating edges from the cluster shade image using a zero crossing test, in which zero crossings are identified at the sites of neighboring pixels shows cluster shade values are opposite in sign. This is equivalent to a segmentation process applied to the cluster shade image.

Closed polygons are formed from the edge images. Smaller polygons are rejected as noise and are not included in the solution.

Cloudy and cloud free polygons are separated on the basis of cloudy areas having a higher albedo and lower temperature than the underlying water body.

The algorithm in the '901 patent is a spectral classification method for clouds and relies on measurements in the following spectral bands:

Channel 1: 585 nm-685 nm
Channel 3: 3,575-3,983 nm
Channel 4: 10,362-11,299 nm
Channel 5: 11,450-12,424 nm As such, embodiments as described in the '901 patent are limited to the AVHRR sensor (or a sensor which performs measurements in the same spectral bands as listed above). Further, embodiments of the method of the '901 patent are based on "the assumption that clouds are colder and brighter than the surrounding ocean." Higher albedo than the underlying land cover is only true when the underlying land cover is large water bodies, like oceans. Thus, the method of the '901 patent is not necessarily accurate over small bodies of water or land.

In U.S. Pat. No. 7,480,052, entitled "Opaque Cloud Detection", J. Roskovensky discloses a method for detecting opaque clouds in digital images. This method operates by comparing the spectral information contained in several different spectral bands defined as follows:

Band Number 1: 400 nm-460 nm
Band Number 2: 630 nm-690 nm
Band Number 3: 860 nm-890 nm The input imagery is converted to top-of-atmosphere reflectance (TOA), which is well-known. Embodiments disclosed in the '052 patent employ three individual cloud tests defined below:

The Normalized Blue-Infrared Reflectance difference (NBIRD) is computed. The NBIRD ratio is defined as $(R_3-R_1)/(R_3+R_1)$, where $R_3$ is the reflectance in band number 3, and $R_1$ is the reflectance in band number 1.

The Reflectance Ratio (RR) is computed. The RR is defined as $R_3/R_2$ where $R_2$ is the reflectance in band 2.

The Visible Reflectance ($R_2$) is computed, and is defined as simply the band 2 reflectance.

In an embodiment, certain thresholds for each ratio are established that are either empirically determined from the data or defined from theoretical arguments. Testing a given pixel for presence of cloud comprises computing the quantities defined above for the pixel and testing the results against pre-defined thresholds. In an embodiment, the method uses all three cloud tests and opaque clouds tend to pass all three cloud tests. In addition, the '052 patent defines cloud probability values for each test that are based on a linear scaling of the measured result between the limits of the threshold. The three individual cloud probabilities are combined into a cloud probability (CP) measure which quantifies the overall probability that the pixel is a cloud. The cloud probability is defined as $\text{sqrt}((\text{sqrt}(CP_{RR} * CP_{NBIRD})*CP_{R2}))$ where $CP_{RR}$ is the cloud probability from the RR test, $CP_{NBIRD}$ is the cloud probability from the NBIRD test, and $CP_{R2}$ is the cloud probability from the $R_2$ test.

Thus, the method disclosed in '052 patent is a spectral classification method that may be said to rely on the presence of at least three spectral bands in the visible wavelength range from 400 nm to 890 nm. Three spectral quantities are performed for each pixel in the image and the results are compared to pre-defined ratios designed to indicate the presence of a cloud. Mention is made in the '052 patent of applying its method specifically to sensors which collect data at a spatial resolution of 250 m and specific reference is made to the MODIS sensor. The '052 patent therefore suggests its method could not be successfully applied to high resolution imaging sensors, such as those used in modern high resolution imaging satellites.

BRIEF SUMMARY OF THE INVENTION

Provided herein are systems and methods for assessing cloud cover in imagery which, in some embodiments, only require the imagery to be collected in a single spectral channel and does not require the existence of any additional spectral information. The details of one or more embodiments of the disclosure are set forth in the accompanying drawings and the description below. Other features, objects, and advantages will be apparent from the description and drawings.

In one embodiment, a method for identifying cloudy pixels in a target image is provided. The method comprises: acquiring the target image, the target image comprising pixels associated with geographic coordinates, the geographic coordinates being associated with at least one feature; retrieving a cloud-free image from a cloud-free database, the cloud-free image corresponding with the target image and containing coincident geographic coordinates associated with a coincident feature; automatically matching the at least one feature of the target image with the coincident feature of the cloud-free image; based on the matching, automatically determining a cloud presence probability for each pixel in the target image; automatically producing a probability raster image based on the cloud presence probability for each pixel in the target image; using the probability raster image, automatically determining a cloud fraction, the cloud fraction being a ratio of high probability cloud pixels and total number of pixels; automatically computing a confidence measure; establishing a cloud fraction threshold and a confidence measure threshold; automatically measuring the cloud fraction against the cloud fraction threshold to obtain a cloud fraction result; automatically measuring the confidence measure against the confidence measure threshold to obtain a confidence measure result; and using the cloud fraction result and the confidence measure result, determining whether the target image contains cloudy pixels.

In another embodiment, the matching step comprises using a normalized cross-correlation metric.

In yet another embodiment, the present invention includes one or more machine-readable mediums having stored thereon a sequence of instructions, which, when executed by a machine, cause the machine to automatically identify cloudy pixels in a target image, the target image comprising pixels associated with geographic coordinates, the geographic coordinates being associated with at least one feature, by performing the actions of: retrieving a cloud-free image from a cloud-free database, the cloud-free image corresponding with the target image and containing coincident geographic coordinates associated with a coincident feature; matching the at least one feature of the target image with the coincident feature of the cloud-free image; based on the matching, determining a cloud presence probability for each pixel in the target image; producing a probability raster image based on the cloud presence probability for each pixel in the target image; using the probability raster image, determining a cloud fraction, the cloud fraction being a ratio of high probability cloud pixels and total number of pixels; computing a confidence measure; comparing the cloud fraction against a predetermined cloud fraction threshold to obtain a cloud fraction result; comparing the confidence measure with a predetermined confidence measure threshold to obtain a confidence measure result; and using the cloud fraction result and the confidence measure result, determining whether the target image contains cloudy pixels.

BRIEF DESCRIPTION OF THE DRAWINGS

The accompanying drawings, which are incorporated into and constitute a part of this specification, illustrate one or more embodiments of the disclosure and, together with the detailed description, serve to explain the present invention. Like reference symbols in the various drawings indicate like elements. In the drawings:

FIG. 7 shows raw (unfiltered) normalized magnitude results (A) and normalized magnitude combined with intensity results (B) resulting from normalized cross correlation processing, according to an embodiment;

DETAILED DESCRIPTION OF THE INVENTION

Figure 1:
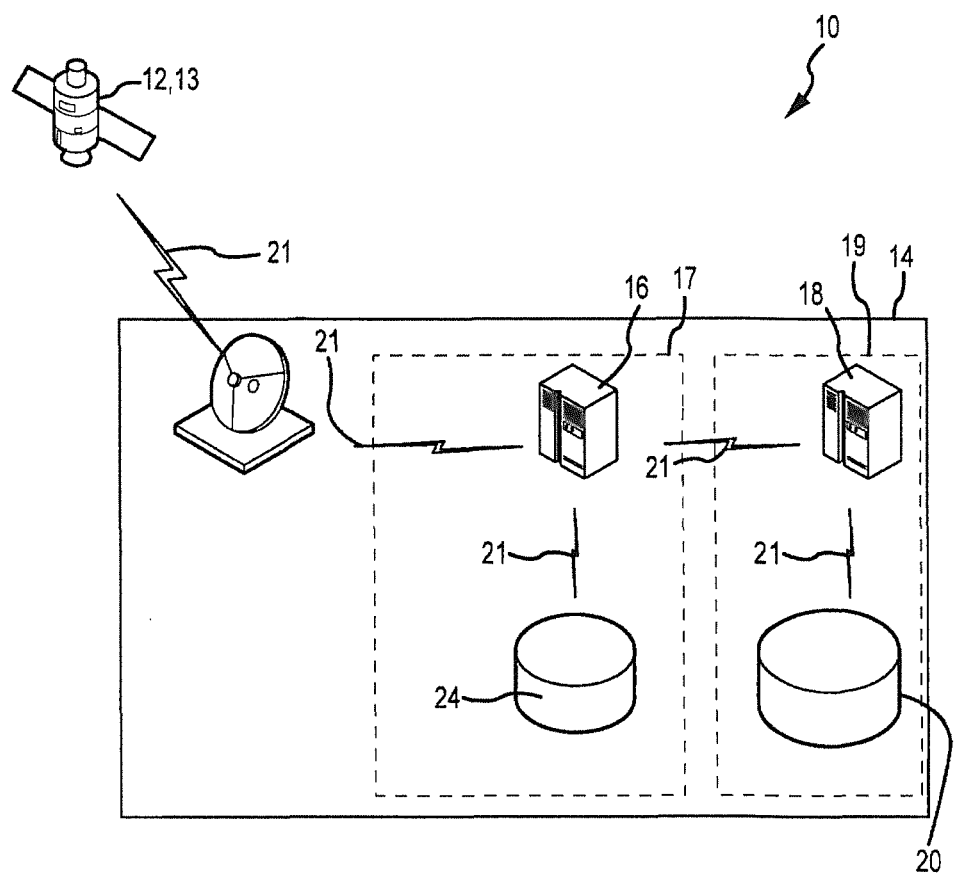
FIG. 1 shows a system including a remote imaging sensor, a ground terminal, an image processing system, a cloud cover assessment system, and a cloud free image database, according to an embodiment of the present invention.

System 10 and method 100 of the present invention comprise or implement various processes for identifying cloudy pixels 30 in target image 28 by reference to cloud-free image 26 from cloud-free database 20. Embodiments of the present invention overcome prior art disadvantages (described below) in that they can be used with panchromatic imagery alone without the need to rely on additional information provided by digital images taken in other spectral bands.

Known functional techniques for cloud detection exploit multispectral imagery and make use of the spectral information collected by the sensor to distinguish cloudy pixels from non-cloudy pixels. However, these techniques are not designed to process panchromatic imagery.

While one technique called "thresholding" may be employed to create a cloud mask for panchromatic image data, it is not without its drawbacks. In practice, an input image is converted to top-of-atmosphere (TOA) reflectance (e.g., the ratio of the amount of light reflected by a target to the amount of light that illuminates the target) to remove the effects of variation in illumination from the imagery. All pixels in the top-of-atmosphere reflectance image with brightness values above a configurable threshold are identified as potential cloud pixels. Unfortunately, since many types of land cover have high albedo, for example, desert sand and snow, and occupy the same albedo range as clouds, this technique often produces a high false positive rate of cloudy pixel identification over bright targets. In an effort to avoid this problem, threshold values are often selected that are high and thus false positives are only observed over the brightest targets. However, when the threshold is set to a high value, less bright clouds are missed since their albedos are below the threshold value. The foregoing technique therefore suffers from not only false positives over bright areas, but also sacrifices sensitivity, missing many cloudy pixels.

Others have attempted to employ spatial techniques in combination with machine learning techniques, like support vector machines and neural networks, to identify clouds in remote sensing imagery when only brightness information is available. Generally, these techniques are trained on a training set consisting of a small number of representative images and a training rule or solution is learned from the data. Then, the solution is applied across a wider set of images that were not part of the training set. The results generally are quite poor, with some classifiers performing only marginally better than a random decision engine.

Thus, the known art lacks suitable systems or methods for assessing cloud cover in imagery collected in a single spectral channel (e.g., panchromatic band) which does not require the existence of any additional spectral information. In addition, lack of suitable systems and methods for assessing cloud cover in digital imagery means that relatively old cloud-free images have been allowed to languish in known cloud-free data bases, without frequent updates, thereby undermining the current utility of such databases over time.

The present invention comprises embodiments of system 10 and method 100 for predicting the cloud content of target image 28 acquired by a remote sensing satellite or aerial sensors, such as, for example remote imaging sensor 12. Unlike prior art cloud cover assessment systems and methods, in embodiments of the present invention, digital imagery (e.g., target image 28) may be collected only in a single spectral channel without requiring additional spectral information. Thus, in some embodiments, target image 28 is a panchromatic image and no spectral information is exploited since remote imaging sensor 12 measures only brightness information. In other embodiments, multispectral imagery may be converted to panchromatic imagery.

Figure 2:
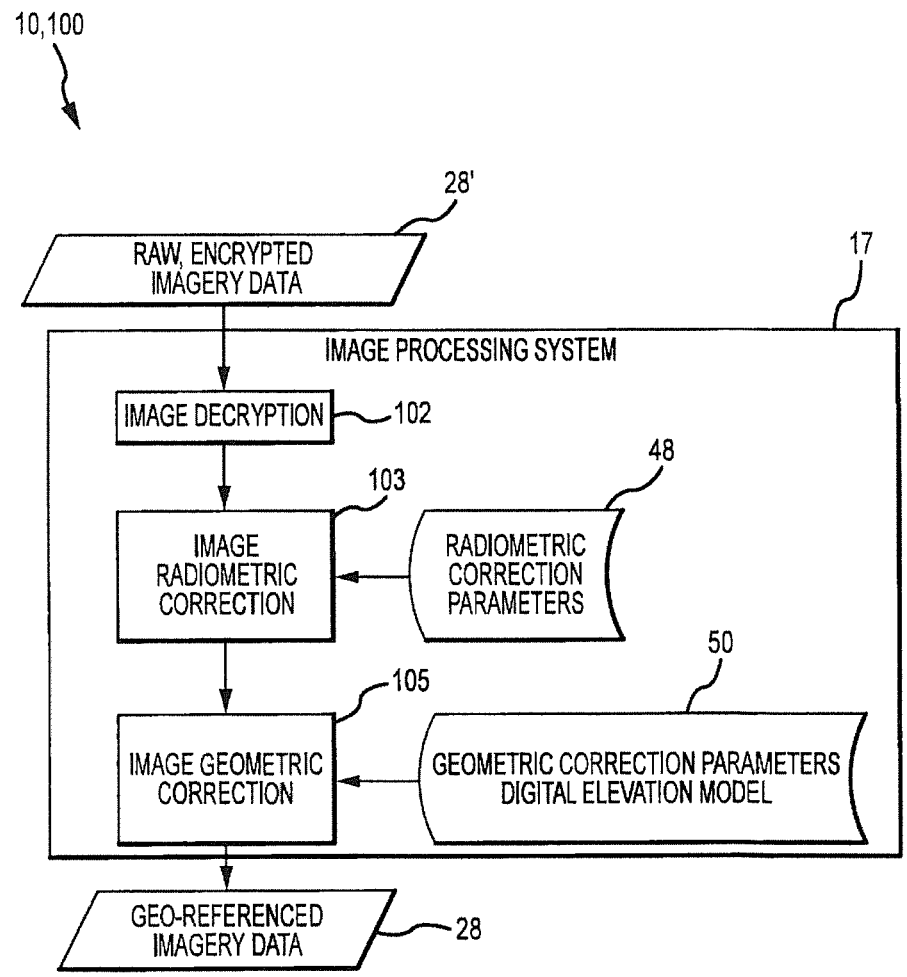
FIG. 2 illustrates steps for image corrections performed by an image processing system, according to an embodiment of the method of the present invention.

FIG. 1 shows an embodiment of system 10 of the present invention comprising a satellite 13 equipped with remote imaging sensor 12, and ground terminal 14. Ground terminal 14 comprises communications dish 22, image processing system 17 and cloud cover assessment system 19. As shown, satellite 13 with remote imaging sensor 12 communicates with ground terminal 14 and transmits digital imagery via radio waves 15 received by communications dish 22. Communications dish 22 then transmits digital imagery, such as raw target image 28', via communications link 21 to image processing system 17 that comprises image processing central processing unit (CPU) 16 and system database 24. Communications link 21 may comprise a wired or wireless communications link, as are well known. Image processing CPU 16, following instructions embedded in software, may automatically and appropriately process raw target image 28' for use in connection with the method 100 (e.g., as shown in FIG. 2). Thus, as shown in FIG. 2, encrypted raw target image 28' data may be de-encrypted 102 and decompressed by image processing system CPU 16 which converts raw, encrypted imagery data to geographically-referenced imagery so that the target image 28 data may be manipulated to assess cloudy pixels 30 in target image 28 in accordance with embodiments of method 100 of the present invention.

In embodiments of method 100, raw target image 28' may also be subjected to image radiometric correction 103, using radiometric correction parameters 48 that are well-known. In other embodiments, raw target image 28' may also be subjected to image geometric correction 105, using geometric correction parameters 50 as contained in a digital elevation model, to produce geographically-referenced target image 28; however these steps 104, 106 may not be required. Target image 28 may be stored in system database 24.

Figure 3:
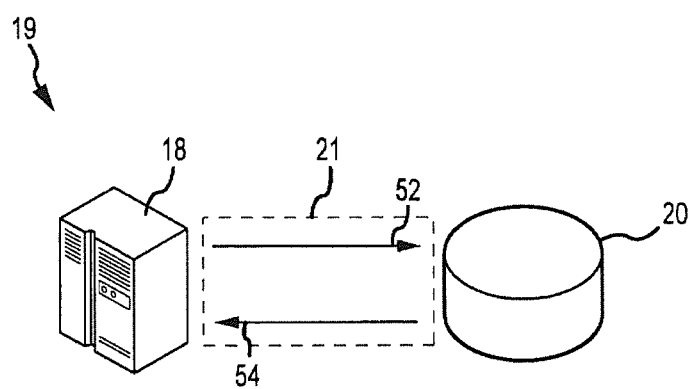
FIG. 3 shows retrieving a cloud-free image from the cloud-free image database using the cloud cover assessment system, according to an embodiment of the present invention.

Image processing system 17 communicates with cloud cover assessment system 19 via communications link 21 so that digital images (e.g., target image 28, cloud-free image 26) may be transmitted back and forth for comparison and processing according to embodiments of method 100. For example, as explained in more detail below, in embodiments of method 100, target image 28 may be compared to cloud-free image 26, which, like target image 28, may be a panchromatic image. Cloud cover assessment system 19 comprises cloud cover assessment system CPU 18 and cloud-free image database 20 in which cloud-free image 26 may be stored and from which cloud-free image 26 may be retrieved in response to data request 52. As shown in FIG. 3, cloud-free image database 20 is linked to cloud cover assessment system CPU 18 via communications link 21. In response to data request 52 from the cloud cover assessment system CPU 18, cloud-free image database 20 may send cloud-free image 26 data back to cloud assessment system CPU 18 via image data link 54. Cloud-free image database 20 will be described in greater detail below. Cloud cover assessment system CPU 18, following instructions embedded in software, automatically performs steps in method 100 as explained in more detail below.

Components of the system 10 of the present invention may or may not be in the same physical location. Thus, in one embodiment, image processing system 17 and cloud cover assessment system 19 reside at the same physical location as communications dish 22; however, this is not required. In another embodiment, image processing system 17 and cloud cover assessment system 19 reside at different physical location(s) than the communications dish 22 as would be apparent to one of ordinary skill in the art after becoming familiar with the teachings of the present invention since communications link 21 may be wireless.

Cloud-free image database 20 will now be discussed in greater detail. Cloud-free image database 20 of the Earth may be obtained from a variety of sources. In one embodiment, cloud-free image database 20 of the Earth is provided by the Landsat-7 global mosaic, a widely available mosaic consisting of approximately 8,000 individual predominantly cloud-free images 20 of the Earth collected between 1998 and 2000 by the Landsat 7 sensor. The spectral coverage of the panchromatic band of the Landsat 7 sensor ranges from about 520 nm to about 900 nm and the spatial resolution of the imagery is 15 m.

In another embodiment, cloud-free database 20 of the Earth comprises a color representation of the Landsat-7 global mosaic, such as the simulated natural color Landsat 7 mosaic. The "NaturalVue" dataset is an example of such a color representation. The NaturalVue dataset is a pan-colorized version of the Landsat-7 global mosaic with spectral colors corresponding to red, green, and blue. When ingesting this dataset as cloud-free database 20 of the Earth's surface, in various embodiments, three-band data of the pan-colorized imagery is converted into a single panchromatic dataset using the following equation:

$$p=(r+g+b)/3.0 \qquad \text{Equation 1}$$

where p indicates the panchromatic response, r is the red response, g is the green response, and b is the blue response.

In yet another embodiment, cloud-free database 20 of the Earth may be assembled by mining the existing image archive of the sensor under consideration for cloud-free image 26, and assembling a mosaic of cloud-free images 26 in a predominantly cloud-free model of the Earth's surface. The mosaic may comprise multispectral or panchromatic images, depending on the characteristics of the sensor under consideration. In the case of multispectral imagery, cloud-free image 26 may be converted to a panchromatic representation using an equation similar to that shown above.

In some embodiments, the cloud-free database 20 of the Earth's surface is hosted on a computer system that accepts requests (e.g., data request 52) for imagery framed by geographic coordinates and possibly other metadata parameters and provides rapid response for requests from clients. The cloud-free database 20 system delivers cloud-free images 26 from the cloud-free image 26 base layer underlying or intersecting the geographic coordinates specified in the request (e.g., via image data link 54). Cloud-free images 26 may be delivered in a variety of formats, such as GeoTIFF.

In some embodiments, the cloud-free database 20 system delivers cloud-free images 26 in response to geographic requests from clients utilizing the suite of Open Geospatial Consortium ("OGC") compliant web services. OGC services provide specifications for finding and retrieving geospatial data via the internet. In some embodiments, the cloud-free database 26 system utilizes the OGC web mapping services and web coverage services specifications. Of course, other methods and systems to deliver the cloud-free image 26 base layer data to system 10 may also be used.

In one embodiment, system 10 is used in conjunction with method 100 to automatically identify cloudy pixels 30 in target image 28 following instructions embedded in software. Method 100 comprises acquiring 101 target image 28 and retrieving 104 cloud-free image 26. In some embodiments, the cloud cover assessment system 19 extracts the geographic coordinates of target image 28 to which cloud-free image 26 corresponds; cloud-free image 26 is then retrieved 104 from cloud-free image database 20. The cloud cover assessment system 19 automatically matches 108 at least one feature 32 of target image 28, applying an optimized feature matching algorithm, in which feature 32 in target image 28 is matched 108 with a coincident feature 32' in cloud-free image 26. Features 32, 32' in common between target image 28 and cloud-free image 26 will tend to match well, while features 32, 32' that are not common between target image 28 and cloud-free image 26 will not match well. Feature matching step 108 exploits a characteristic of feature matching statistic 36 that tends to match very poorly with cloudy pixels 30. From feature matching statistic 36, a cloud presence probability is automatically determined for each pixel in target image 28. A probability raster image is produced based on the cloud presence probability for each pixel in target image 28. Using the probability raster image, cloud fraction 38 is automatically determined, cloud fraction 38 representing a ratio of high probability cloudy pixels to total number of pixels in target image 28. A confidence measure 44 is also automatically computed 118. If the cloud fraction 38 is low and the confidence measure 44 is the result is high, then it is deemed likely that the target image 28 is substantially cloud-free. In method 100, whether values are "high" or "low" may be determined by reference to previously established thresholds or other parameters such as would be familiar to one of ordinary skill in the art after becoming familiar with the teachings of the present invention. As such target image 28 is considered to be a candidate to update the cloud-free image database 20. Therefore, method 100 further comprises designating 124 target image 28 for inclusion in cloud-free database 20. Finally, target image 28 may be included 126 in cloud-free image database 20.

Having described system 10 of the present invention, method 100 will now be described with reference principally to an embodiment described in FIGS. 4 (A and B). As mentioned above, target image 28 is acquired 101 using known techniques, such as the use of satellite 13 or aerial based imagery sensors, such as remote imaging sensor 12. After acquiring 101 target image 28, method 100 may comprise converting 107 target image 28 from digital numbers (DNs) to top-of-atmosphere reflectance (TOA) into converted target image TOA_TI 28" using metadata from target image 28, (e.g., atmospheric, solar and sensor parameters 49 such as date, time of collection, and energy flux from the Sun) when target image 28 was acquired 101. In some embodiments, converting 107 target image 28 may comprise using the following equation:

$$\text{TOA\_TI}[i] = \frac{\pi L_{rad,\lambda}[i] d^2}{E_{SUN,\lambda} \cos(\theta_s)} \quad \text{Equation 2}$$

where $L_{rad}$ is the spectral radiance measured in band λ at the sensor's aperture, d is the Earth-Sun distance in astronomical units, $E_{SUN}$ is the mean solar exoatmospheric irradiances in band λ, $\Theta_S$ is the solar zenith angle (where 0 is straight overhead), and i indicates the specific pixel in target image 28. The conversion 107 from digital numbers to spectral radiance is, in some embodiments, dependent on the sensor (e.g., remote imaging sensor 12) under consideration. For example, the conversion for the QuickBird sensor proceeds as follows:

$$L_\lambda[i] = \frac{K_\lambda DN_\lambda[i]}{\Delta_\lambda} \quad \text{Equation 3}$$

where $L_\lambda$ is the radiance measured in band X at the sensor aperture, $K_\lambda$ is the absolute radiometric calibration factor for band λ (sensor dependent) and $DN_\lambda$ is the digital number for band λ, delta is the effective bandwidth of band *, and i indicates a specific pixel in target image 28.

In other embodiments of method 100, additional preprocessing of target image 28 may be advisable or even required depending on the manner in which target image 28 was acquired 101 or is going to be manipulated in accordance with various embodiments of method 100. Thus, it may be necessary or advisable to convert multispectral imagery to panchromatic imagery or vice versa, depending in part on the manner in which cloud-free image 26 is maintained in cloud-free image database 20.

As mentioned above, method 100 comprises determining whether target image 28 contains cloudy pixels 30, and if so, how many cloudy pixels 30, by reference to corresponding cloud-free image 26. Thus, method 100 comprises retrieving 104 cloud-free image 26 from cloud-free image database 20 by reference to geographic coordinates of target image 28. In embodiments of method 100, a bounding box of TOA_TI 28" is identified and tied to its geographic coordinates. The bounding box may be co-extensive with the boundaries of TOA_TI 28" or it may define an area of interest within TOA_TI 28". Geographic coordinates of the bounding box of TOA_TI 28" may be automatically identified from metadata accompanying target image 28. The geographic coordinates of the bounding box are used to retrieve 104 cloud-free image 26 that may be coincident with or contain the same geographic coordinates of the bounding box.

Figure 5:
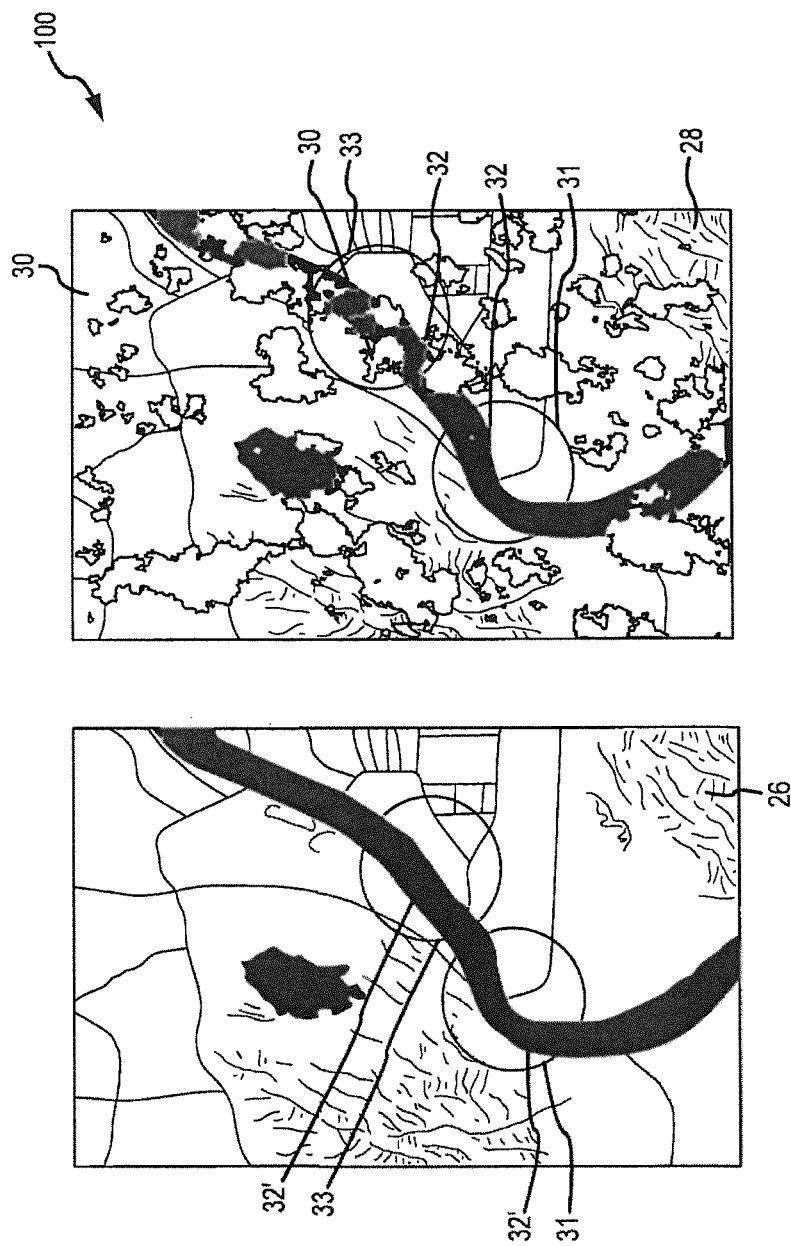
FIG. 5 shows a Landsat 7 cloud-free image compared with a target QuickBird image collected over the same geographic area.

FIG. 5 shows target image 28 with its corresponding cloud-free image 26 (over the same geographic area of interest defined by the bounding box) retrieved 104 according to an embodiment of method 100 from cloud-free image database 20. Target image 28 is panchromatic; similarly, cloud-free image 26 is a Landsat 7 panchromatic cloud-free image 26. Target image 28 was acquired 101 by the QuickBird high-resolution commercial earth observation satellite over the same geographic area as the Landsat 7 cloud-free image 26. An advantage of having both target image 28 and cloud-free image 26 in the panchromatic spectral band is the higher spatial resolution typically afforded by the panchromatic band. In addition, it may be simpler to perform the steps of method 100 by starting with both images in the panchromatic band.

FIG. 5 shows a typical example of the correspondence between target image 28 and cloud-free image 26, in which common features 32, 32' can be easily recognized as between the two images. As depicted, the registration between target image 28 and cloud-free image 26 lies within 1-2 pixels. As used herein, "registration" refers to any physical difference in ground location between the target and cloud free images 28, 26 caused by systematic uncertainties in the image acquisition 101, earth position, and terrain model used to georeference the imagery. Poorly registered images are termed to be "mis-registered" and can typically be off by many pixels. Also as shown, the date of acquisition of the Landsat 7 cloud-free image 26 is unknown but the temporal difference between the images may be on the order of several years. A strong visual correspondence appears between feature 32 in target image 28 and corresponding, or coincident, feature 32' (when not covered by clouds) in cloud-free image 26. As shown by comparing feature 32 with corresponding feature 32' within circle 31, features 32, 32' match strongly between the images, indicating that the pixels of feature 32 within circle 31 in target image 28 are cloud free. Conversely, as shown by comparing feature 32 with corresponding feature 32' within circle 33, feature 32 covered by clouds within circle 33 in target image 28 matches very poorly with corresponding feature 32' within circle 33 in cloud-free image 26. Since cloud-free image 26 is considered to be substantially cloud-free, then the pixels within circle 33 of target image 28 are considered to be possibly cloudy pixels 30.

Figure 4A:
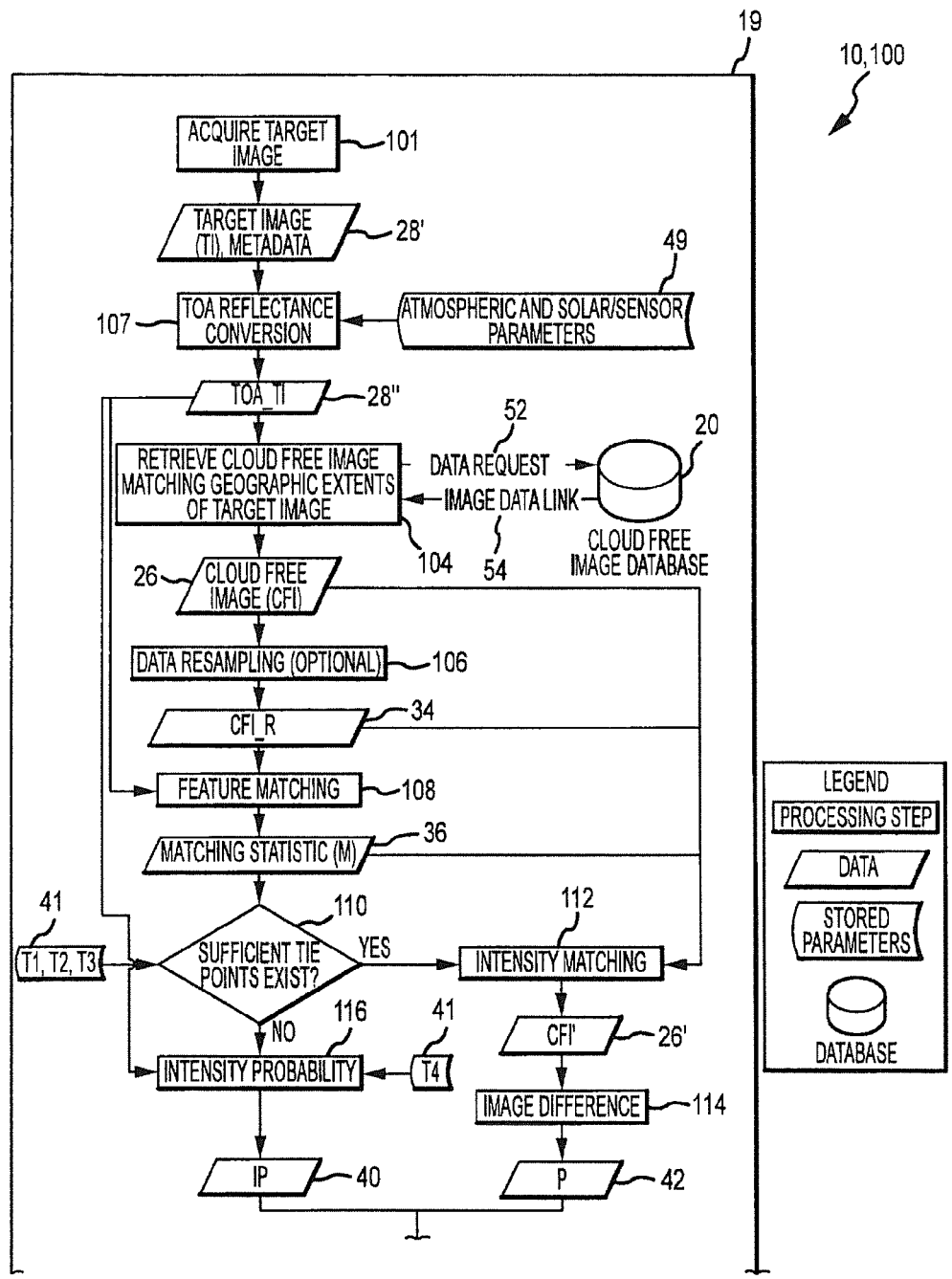
FIGS. 4 (A and B) shows steps in the method performed by the system for identifying cloudy pixels, according to an embodiment of the present invention.
Figure 4B:
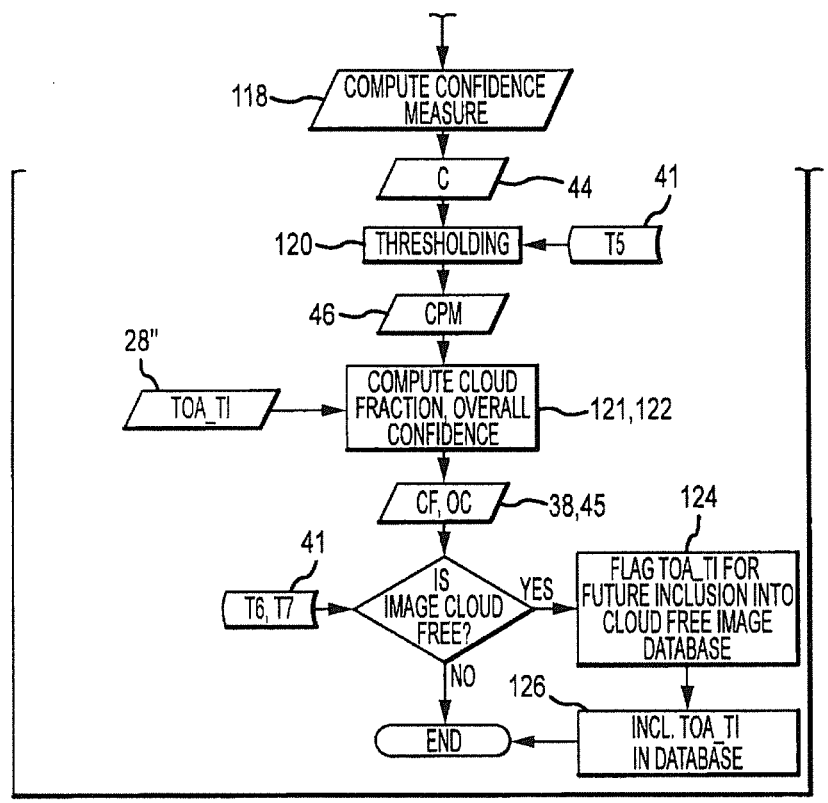

Returning now to steps in method 100 as shown in FIG. 4, in one embodiment, after target image 28 is acquired 101 and cloud-free image 26 is retrieved 104, data scaling and re-sampling 106 may be performed by cloud cover assessment system 19. Data sampling and rescaling 106 ensures that the x and y dimensions of the cloud-free image 26 match the x and y dimensions of target image 28. However, in embodiments in which an OGC-compliant service is used, the OGC-compliant service takes care of data scaling and re-sampling 106; thus, data scaling and re-sampling 106 may not need to be executed.

In various embodiments, method 100 further comprises automatically matching 108 features 32 from the TOA_TI 28" with corresponding feature 32' in cloud-free image 26. See, e.g., FIG. 5. A matching statistic (M), or displacement magnitude, may be calculated, in which the value of M for a given pixel indicates a cloud presence probability, i.e. the probability that the pixel is a cloud. As discussed in greater detail below, in the case of high values of M, the cloud presence probability may be high. High values of M may be indicated by values that exceed a predetermined threshold. In the case of low values of M, cloud presence probability may be low. Low values of M may be indicated by values that fall below the predetermined threshold.

During matching 108, pixels in target image 28 are automatically compared to corresponding pixels at a similar geographic location in cloud-free image 26 through an optimized feature matching process. In embodiments of method 100, matching 108 features 32 may comprise using a normalized cross correlation metric resulting from application of a normalized cross correlation process. Normalized cross correlation is independent of brightness and, in some embodiments, serves as an ideal metric for feature matching 108 for the purposes of cloud detection.

In some embodiments, the normalized cross correlation process comprises a kernel-based algorithm in which a reference window ($K_R$) from the cloud-free image 26 base layer (usually square, with size $D_R$) is compared with a larger search window ($K_S$) from target image 28 (also square, with size $D_S$). While the reference window and search window need not be square necessarily, they should both be the same general shape, with the search window being generally larger than the reference window. The equation for the normalized cross correlation metric is shown in Equation 4 below.

In some embodiments, the normalized cross correlation process is performed on every pixel in the image. In other embodiments, to minimize computation demands, the normalized cross correlation process may be performed on a neighborhood of pixels centered on a sub-sampled grid of points covering target image 28. For example, in one embodiment, the sub-sampling factor is 20 pixels in the X direction and 20 pixels in the Y direction. Of course, other factors may be used. The calculation of the correlation at each point in the grid proceeds, in some embodiments, as follows:

For a grid point at location (i, j), the search window is defined, in some embodiments, as a square of pixels of size $D_S$ centered at location (i, j) in target image 28. The reference window is, in some embodiments, defined as a square of pixels of size $D_R$ centered and location (i, j) in the cloud-free image 26.

The search window comprises pixels from target image 28 and the reference window comprises pixels from cloud-free image 26. In some embodiments, $D_S$ and $D_R$ are both odd numbers so that the location of the center pixel is obvious in the window. In some embodiments, $D_R<D_S$. In some embodiments, $D_R$=31 and $D_S$=63, but the invention should not be viewed as being limited in this respect; other values, of course, can also be used.

Since, in some embodiments, the search window is always larger than the reference window, the computation of the normalized cross correlation discrete points in metric is carried out at the search window as follows.

$$C(m, n) = \frac{(R(m, n) - \mu_R) \times (S(m, n) - \mu_S)}{\sqrt{(R(m, n) - \mu_R)^2 \times (S(m, n) - \mu_S)^2}} \quad \text{Equation 4}$$

Where
C (m,n) is the correlation value at location m,n
R (m,n) is the reference window value at location m,n
S (m,n) is the search window value at location (m,n)
$\lambda_R$ is the mean of the reference window
$\lambda_S$ is the mean of the search window In some embodiments, the index m=[0+$D_R$/2, $D_S$/2−$D_R$/2−1] in integer increments and the index n=[0+$D_R$/2, $D_S$/2−$D_R$/2−1] in integer increments. These indices correspond to locations inside the search window in which a full square of reference pixels from cloud-free image 26 can be read without running over edge boundaries in the search window. In some embodiments, a correlation value is computed at each correlation point P in which $K_R$ lies within $K_S$.

Figure 6A:
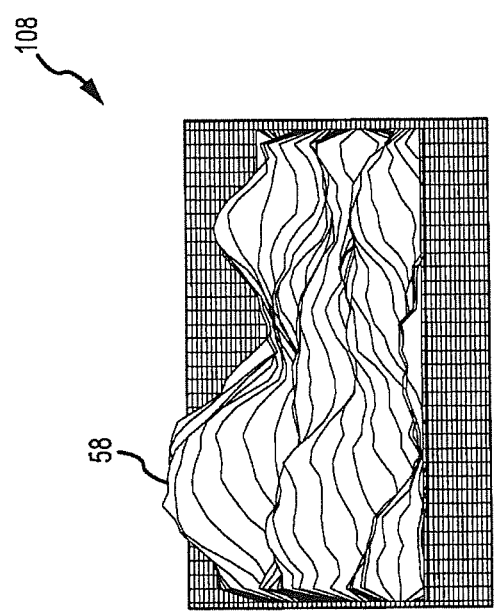
FIG. 6 shows a high quality correlation peak (A) as compared to a poor quality correlation peak (B) between the target image and the cloud-free image, according to an embodiment of the method of the present invention.
Figure 6B:
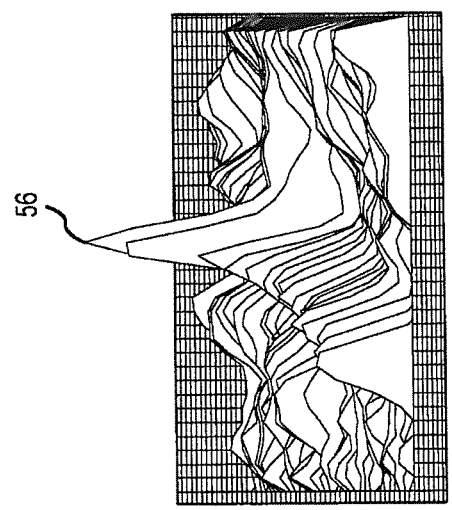

Referring now to FIG. 6, the resulting set of correlation points forms a correlation surface. In embodiments of method 100, correlation values on the surface range between −1.0 and 1.0. In some embodiments, matching 108 features 32 between target image 28 and cloud-free image 26 comprises using the normalized cross correlation metric by examining the correlation surface and searching for a local well-defined maximum correlation point. According to embodiments of method 100, the quality of the correlation point indicates the cloud presence probability. A high quality correlation peak 56 indicates a strong match and, thus, may indicate cloud-free pixels in target image 28. High quality correlation peak 56, as shown in FIG. 6(A), exhibits both a high correlation value and a sharply defined peak such that the shape of the peak looks like a sharp spike rather than a broad "hill". In contrast, low quality correlation peak 58 indicates a poor match and, thus, may indicate cloudy pixels 30 in target image 28. Low quality correlation peak 58 has the appearance of the broad hill, as shown in FIG. 6(B).

In prior art applications using normalized cross correlation, it may have been customary to search for strong matches characterized by high quality correlation peak 56, because the target images 28 with the best matches are often of most interest. In contrast, however, in embodiments of the present invention, method 100 may comprise searching for low quality correlation peaks 58. Since low quality correlation peak 58 may indicate cloudy pixels 30, TOA_TI 28" (or a portion thereof) associated with low correlation peak 58 may be immediately discarded without further processing, thus minimizing the universe of target images 28 that may be subjected to additional steps of method 100.

In some embodiments, once the correlation peak is identified, it may be fit with a spline function in both the x and y directions in an attempt to model the location of the peak to sub-pixel accuracy. However, this is not required. If sub-pixel accuracy is not desired, then the integral coordinates for the correlation peak are used. The x and y coordinates of the location of the correlation peak measure the offset between the location of the feature 32 in the reference window and the search window, ΔX and ΔY.

Thus, in some embodiments, system 10 implementing steps of method 100 determines the correlation peak location as follows:

$$[m,n,PH]=\text{MAX}(\text{abs}(C)) \quad \text{Equation 5}$$

where PH (peak height) is maximum correlation peak value and m specifies the x location of the correlation value corresponding to PH, and n specifies the y location of the correlation value corresponding to PH.

The offsets from the center of the search window are, in some embodiments, determined as follows:

$$\Delta X = D_S/2 - m$$

$$\Delta Y = D_S/2 - n \quad \text{Equation 6}$$

In some embodiments, raw ΔX and ΔY values are used as they are computed.

The ΔX and ΔY values are, in some embodiments, combined to provide the magnitude of motion at every grid point in the target image 28 as follows:

$$M_i = \frac{\sqrt{\Delta X_i^2 - \Delta Y_i^2}}{\sqrt{\Delta X_{MAX}^2 + \Delta Y_{MAX}^2}} \quad \text{Equation 7}$$

where $M_i$ is the normalized magnitude of the shift between target image 28 and cloud-free image 26 at pixel location "i", and $\Delta X_{MAX}$ and $\Delta Y_{MAX}$ are the maximum allowed displacements in the X and Y directions, dependant on both $D_R$ and $D_S$:

$$\Delta X_{MAX} = D_S/2 - /2 - 1 - D_R/2 = D_S/2 - D_R - 1$$

$$\Delta Y_{MAX} = D_S/2 - D_R/2 - 1 - D_R/2 = D_S/2 - D_R - 1 \quad \text{Equation 8}$$

Referring now to FIG. 7, depicted are raw (unfiltered) normalized magnitude results (FIG. 7(A) (e.g., normalized magnitude image 60) and normalized magnitude results combined with intensity (FIG. 7(B) (e.g., normalized magnitude plus intensity image 62). The correlation results are shown for pixels with intensity exceeding 900 DNs in the QuickBird target image 28 in normalized magnitude plus intensity image 62. The normalized magnitude for these pixels ranges from 0.40-1.0. Applicant has observed during experiments that the normalized magnitude metric produces large values when matching on cloudy pixels 30 (i.e., high values of M are observed). This is because the intensity pattern of cloudy pixels 30 is non-distinct and rarely provides a good match. As is apparent in FIG. 7, the magnitude of motion measured on cloudy pixels 30 is large. Thus, the M metric is a useful indicator of cloud presence probability. When the normalized magnitude results are combined with intensity, the normalized magnitude plus intensity image 62, in some embodiments, become a reliable indicator of cloudy pixels 30, as evidenced by comparing normalized magnitude image 60 with normalized magnitude plus intensity image 62. Cloudy pixels 30 cannot very easily be discerned in normalized magnitude image 60, while, in contrast, cloudy pixels 30 can be easily discerned in normalized magnitude plus intensity image 62.

There may be some inherent mis-registration between the TOA_TI 28" and cloud-free image 26 that may be reflected in the values of M that are computed. Experimentally, Applicant has found in practice that the mis-registration is on the order of 1-2 pixels and thus is a small effect that does not need to be modeled.

In some embodiments in which water is depicted in target image 28, matching 108 features 32 using the normalized cross correlation process may further comprise converting target image 28 and cloud-free image 26 to a substantially similar brightness scale. The normalized cross correlation metric may be unable to match well on water, thus, producing high values of M, indicating high cloud presence probability. Since water may appear as generally texture-less (flat water on a windless day) (low reflectance, see e.g., FIG. 8) or may contain repeating patterns that look visually similar (waves) (high reflectance), in some embodiments, the normalized cross correlation process may confuse the water with the presence of clouds, producing a false positive. Without adjustment, high values of the normalized magnitude may be observed over water, which could be confused with clouds.

In some embodiments, method 100 may comprise implementing a brightness test in order to reduce the false positive rate due to water. To compare brightness values between TOA_TI 28" and cloud-free image 26, method 100 may comprise converting TOA_TI 28" and cloud-free image 26 to a similar brightness scale. In other embodiments, either TOA_TI 28" or cloud-free image 26 may be converted to a brightness scale substantially similar to that of the other image. Since the mosaic process used to create the cloud-free image database 20 generally discards required metadata associated with cloud-free image 26, in some embodiments, rather than attempting to convert the cloud-free image 26 to top-of-atmosphere reflectance, the pixels of cloud-free image 26 are automatically statistically matched to the pixels of TOA_TI 28".

In embodiments of method 100, matching 108 features 32 may be enhanced by automatically identifying tie points and determining 110 whether sufficient tie points exist between the TOA_TI 28" and cloud-free image 26. As explained below, tie points are determined with reference to at least one threshold. Sufficiency of tie points may be determined by number, preferably, in combination with distribution. Thus, a large number of tie points distributed somewhat evenly throughout TOA_TI 28" and cloud-free image 26 would tend to indicate a strong match. On the other hand, tie points clustered together in a small area, would tend to indicate a poor match generally, but a strong match in the small area where the tie points are clustered.

In some embodiments, the step of determining 110 whether sufficient tie points exist is performed by comparing the value of the correlation peak height ("PH") to a first threshold T1. In some embodiments, to ensure a tie point is valid, its peak height must be greater than or equal to 0.90. If the value of the correlation peak height exceeds this threshold, it is considered a candidate tie point. In one embodiment, this comparison may be performed by using a known tie point identification algorithm.

Another comparison is performed in which the magnitude displacement ("M") between the TOA_TI 28" and cloud-free image 26 is compared to a second threshold T2. In some embodiments, T2 is less than or equal to 0.5 (in normalized coordinates). If the magnitude displacement is less than the threshold, these points are determined to be tie points. If the number of points remaining after this comparison equals or exceeds a third threshold T3, then it is determined 110 that sufficient tie points do exist between TOA_TI 28" and cloud-free image 26; otherwise, it is determined that sufficient tie points do not exist between the images. If sufficient tie points do not exist between TOA_TI 28" and cloud-free image 26, target image 28 may be discarded from further analysis according to method 100. Threshold T3 defines a minimum number of available tie points between TOA_TI 28" and cloud-free image 26. The value of T3 will depend on how many total potential candidate tie points are available. In one embodiment, T3=4. In the case where many hundreds of potential tie points exist, then, in some embodiments, T3 may be set to between 10 and 20.

$$PH >= T1 \text{ AND } M <= T2 \qquad \text{Equation 9}$$

where T1=0.90 and T2=0.5.

If it is determined 110 that sufficient tie points do exist between TOA_TI 28" and cloud-free image 26, then, in some embodiments, method 100 further comprises performing 112 intensity matching. In this step 112, a first intensity of cloud-free image 26 is statistically matched to a second intensity of TOA_TI 28". The result is termed CFI' image 26', which has a third intensity. The first intensity of cloud-free image 26 at the locations of the tie points is matched to the second intensity of the TOA_TI 28" at the same points, using a linear relationship as follows:

$$CFI'[i] = A \times CFI[i] + B \qquad \text{Equation 10}$$

where A is the gain and B is the offset. In some embodiments, A and B are determined through a simple least squares fitting process.

In some embodiments, if it is determined 110 that sufficient tie points do exist between the images, method 100 further comprises automatically deriving 114 a difference statistic (D) from an intensity difference of the first intensity of the TOA_TI 28" pixels and the third intensity of the CFI' image 26' pixels. Negative differences are not considered to indicate the presence of clouds, while positive differences are considered to indicate the presence of clouds. Method 100 further comprises deriving a probability statistic (P) 42 from the difference statistic (D), where the value of the probability statistic 42 indicates the likelihood that the pixel is cloudy pixel 30. In some embodiments, the difference image is constructed as follows:

$$D[i] = TOA\_TI[i] - CFI'[i] \qquad \text{Equation 11}$$

Since the reflectance of clouds is generally high, cloudy pixels 30 are expected to be brighter in TOA_TI 28" than in the CFI' image 26'; therefore, it is expected that cloudy pixels 30 should exhibit a positive value in the difference image. Thus, in some embodiments, the system employs a probability measure as follows:

$$PD[i]=D[i]/MAX(D) \text{ if } D[i]>0, \text{ else } PD[i]=0 \qquad \text{Equation 12}$$

As an alternative to performing 112 intensity matching and deriving 114 the difference statistic, in another embodiment, method 100 may comprise deriving 116 an intensity probability 40, as shown in FIG. 5. Deriving 116 the intensity probability 40 may represent a simpler approach to cloud cover assessment, when TOA_TI 28" is substantially covered with clouds and an insufficient number of matching tie points have been identified between the TOA_TI 28" and cloud-free image 26. The insufficient number of tie points may be determined by reference to T3; in one embodiment, T3=4. Thus, an insufficient number of tie points would be fewer than 4. The intensity probability 40 may be derived 116 from the first intensity of the TOA_TI 28" pixels. In some embodiments, a threshold operation is applied to the TOA_TI 28" image in which values of reflectance that are less than a fourth threshold T4 are set to zero, and values equal to or above the threshold are unmodified.

Figure 8:
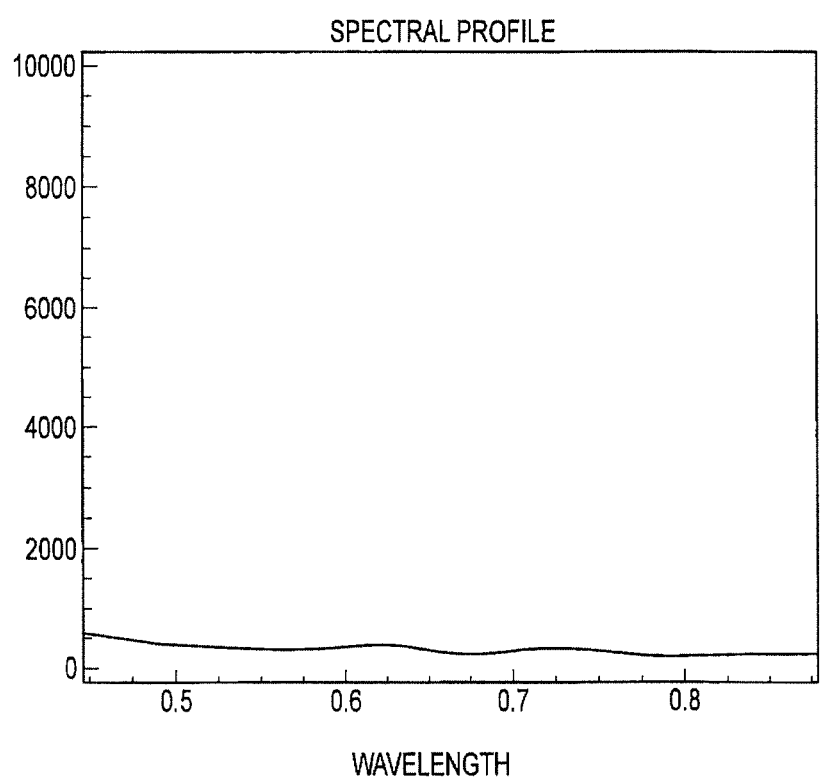
FIG. 8 shows the spectral reflectance of water.
Figure 9A:
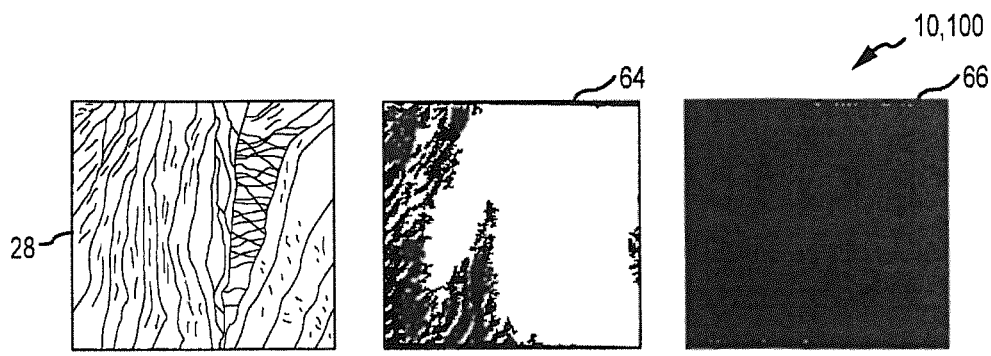
FIG. 9 shows the results from comparing the performance of a prior art thresholding technique to the results produced by the system and method of the present invention, according to an embodiment, in which results are shown with respect to the following Earth cover types: (A) bright desert sand; (B) bright clouds on water over a sandy peninsula; (C) bright desert sand; and, (D) bright desert sand.
Figure 9B:
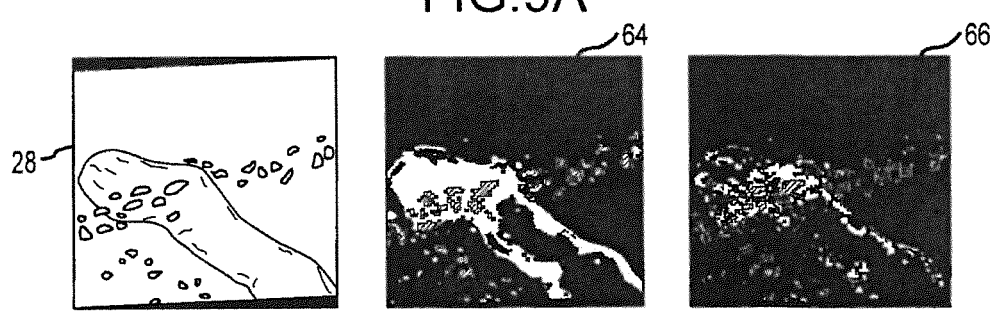
Figure 9C:
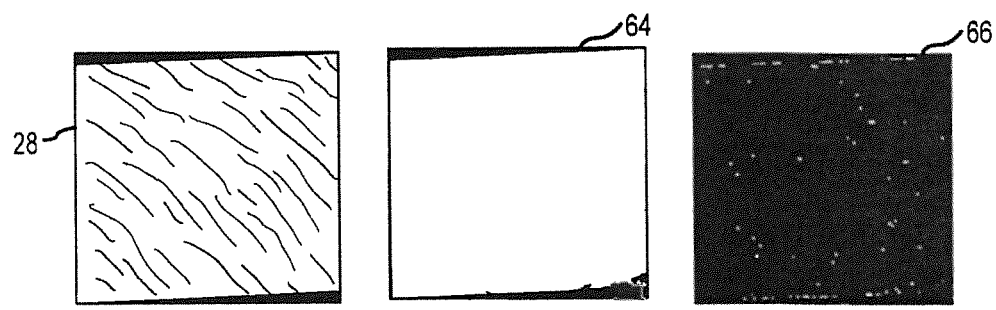
Figure 9D:
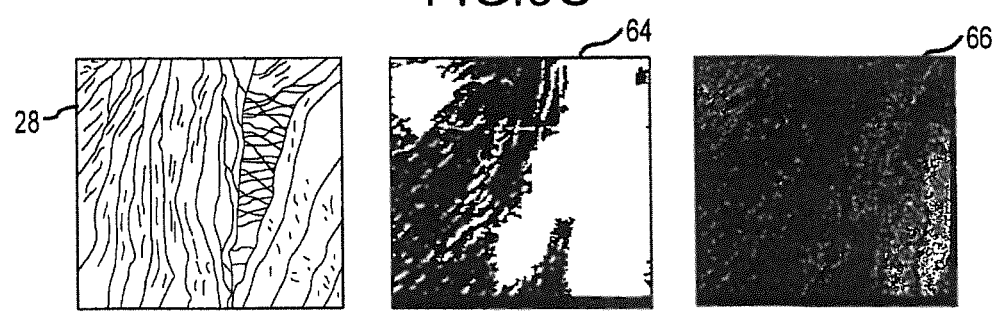

T4 may be established based on typical or expected reflectance values of clouds under certain conditions. Water, for example, has low reflectance, typically less than 10% in optical and Near-Infrared channels. The spectral reflectance of water is shown in FIG. 8. Clouds, on the other hand, have high reflectance values (typically greater than 70%). In some embodiments, therefore, T4=0.70. There, the cloud cover assessment system defines intensity probability (IP) as follows:

$$IP[i]=TOA\_Ti[i] \text{ if } TOA\_TI>=T4, \text{ else } IP[i]=0 \qquad \text{Equation 13}$$

where T4=0.70.

Method 100 further comprises automatically computing 118 a confidence measure (P) 44 that is a measure of probability that each pixel in target image 28 is cloudy pixel 30. High values of confidence measure (P) 44 indicate a high confidence that the pixel in target image 28 is cloudy pixel 30. The confidence measure (P) 44, in some embodiments, based on Bayesian statistical analysis. The system defines hypotheses $H_i$ with two values: IP[i]=cloud or non-cloud. Prior probabilities $Pr(H_i)$ are also defined (with the restriction that the prior probabilities sum to 1), as follows:

$$Pr(H_i) = [1/2, 1/2] \qquad \text{Equation 14}$$

$$\sum_i Pr(H_i) = 1$$

The normalized magnitude statistic M defined above is, in some embodiments, represented as a likelihood of $H_i$ as:

$$\lambda_1 = [M, 1-M] \qquad \text{Equation 15}$$

The probability statistic (PD) defined above is, in some embodiments, represented as a likelihood of $H_i$ as $$\lambda_2 = [PD, 1-PD] \qquad \text{Equation 16}$$

The intensity probability (IP) 40 defined above is, in some embodiments, represented as a likelihood of $H_i$ as $$\lambda_3 = [IP, 1-IP] \qquad \text{Equation 17}$$

When it has been determined 110 that there are sufficient tie points between the images (as discussed above), the overall likelihood vector $\Lambda$ is defined, in some embodiments, as $$\Lambda = \prod_i \lambda_i = \lambda_1 \cdot \lambda_2 \qquad \text{Equation 18}$$

When there are not a sufficient number of tie points between the images, in some embodiments, the overall likelihood vector $\Lambda$ is defined as:

$$\Lambda = \prod_i \lambda_i = \lambda_1 \cdot \lambda_3 \qquad \text{Equation 19}$$

In some embodiments, the overall probability (P), or confidence measure 44, of each hypothesis H, is calculated as $$P(H_i | \lambda) = \alpha P(H_i) \Lambda = \frac{P(H_i) \cdot \Lambda}{\sum P(H_i) \cdot \Lambda} \qquad \text{Equation 20}$$

where alpha is a normalizing factor. In some embodiments, method 100 comprises automatically computing 118 the confidence measure 44 in this manner for every pixel in target image 28 to create a raster representation (e.g., raster image) of target image 28 in which each pixel is characterized by two values, the cloud hypothesis and the non-cloud hypothesis. The raster image is called a P image.

In embodiments of the present invention, method 100 may comprise additional thresholding 120 of target image 28 in which values of P below a threshold T5 are set to zero, while values of P equal to or above the threshold are set to 255. The result is a cloudy pixel mask image 46. The cloudy pixel mask image 46 may also be produced in vector format using a raster to vector conversion process. In some embodiments, the cloudy pixel mask image 46 (CPM) is determined as follows:

$$CPM[i]=255 \text{ if } P[i]>=T5, \text{ else } CPM[i]=0 \qquad \text{Equation 21}$$

In some embodiments, the value of T5 used in method 100 may be established with reference to cloud reflectance values. In one embodiment T5=0.70, though other values can also be used. This threshold serves, in some embodiments, as a confidence filter. The higher the value of T5, the fewer low confidence pixels may be determined to be cloudy pixels 30. On the other hand, some cloudy pixels 30 may be missed. Therefore, in some embodiments, values of T5 between 0.5-0.7 may be employed based on a tradeoff between, on the one hand, allowing low confidence pixels to be assessed as cloudy pixels 30 (perhaps incorrectly) and, on the other hand, the chance of missing cloudy pixels 30 by setting this threshold too high.

In some embodiments, method 100 comprise automatically computing 121 an overall cloud fraction 38 by identifying the number of pixels in the cloudy pixel mask image 46 which are equal to 255, and dividing by the total number of pixels in the cloudy pixel mask image 46 (which may be the same total number of pixels as target image 28).

In some embodiments, an overall confidence measure 45 is computed 122. The overall confidence measure 45 may be a single floating point value. In some embodiments, computing 122 the overall confidence measure 45 may be done by summing up the pixel values in the P image for which the corresponding cloudy pixel mask image 46 pixel is equal to 255, and dividing by the number of cloudy pixels 30 in the P image (which may be the same number of pixels as the target image 28). In some embodiments, the overall confidence measure 45 is computed from the cloudy pixel mask image 46 as described in the following pseudo-code:

```
ncloudypixels = 0
sum = 0
for each pixel i, do:
    if (CPM[i] equals 255) then
        sum = sum + P[i]
        ncloudypixels = ncloudypixels + 1
    endif
OC = sum / ncloudypixels x 100
```

The overall cloud fraction (CF) 38 expressing the fraction of cloudy pixels 30 present in the cloudy pixel mask image 46 is automatically computed 121 in accordance with embodiments of method 100, as follows:

$$CF = ncloudypixels/(nlines \times nsamples) \times 100 \quad \text{Equation 22}$$

where nlines is the number of elements in the y direction of the image and nsamples is the number of elements in the x direction of the cloudy pixel mask image 46.

In various embodiments, method 100 further automatically determining the suitability of target image 28 (e.g., TOA_TI 28") for inclusion into the cloud-free image database 20. If target image 28 is determined to be suitable (e.g., substantially cloud-free) then it may be automatically designated 124 for inclusion in the cloud-free image data base 20. If the cloud fraction 38 is low, meaning it is less than a threshold T6 and if the overall confidence measure 45 is high, meaning it is greater than a threshold T7, then target image 28 is deemed to be substantially cloud-free and is designated 124 for future inclusion into the cloud-free image database 20. In some embodiments, values for T6 and T7 may be predetermined based on a percentage of cloudy pixels 30 that defines an image as substantially cloud-free. For example, in one embodiment, the values of T6 and T7 are predetermined to be 1.0 and 0.90, respectively, although other threshold values are possible. In some embodiments, T6 is set to 1.0 so that only target images 28 with 1.0% or less cloud cover will be used to update the cloud-free image database 20. In some embodiments, T7 is set to 0.90 and indicates the confidence in the assessment is greater than or equal to 0.90. Thus, in the embodiment just described, the two rules ensure that only target images 28 with low cloud percentage, and high confidence assessment would be used to update cloud-free image database 20. Other values can also be used depending on the desired contents of the cloud-free image database 20. Indeed, as the cloud-free database 20 is updated over time, the thresholds T6 and T7 may be adjusted without diminishing the quality of the cloud-free image database 20.

In some embodiments, automatically designating 124 target image 28 for inclusion in the cloud-free database 20 comprises utilizing a boolean flag called update_database. The flag is set to true if the target image 28 meets the criteria outlined above and false if it does not as, expressed in the following pseudo-code:

```
update_database = false
if (CF < T5 AND OC > T6) then:
    update_database = true
endif
```

Target images 28 flagged as true may be included 126 in the cloud-free image database 20.

Having discussed the general operation of embodiments of system 10 and method 100, the currency of the imagery in cloud-free image database 20 is discussed below. "Currency" in this context means the age of the imagery in the cloud-free image database 20. Since the system 10 and method 100 of the present invention comprises comparisons between target image 28 and cloud-free image 26, the age of cloud-free image 26 is naturally a factor. For instance, natural disasters such as tsunamis, earthquakes, or wildfires, tend to make large-scale changes to the type of land cover present on the Earth's surface. The cloud-free image 26 acquired prior to the date and time of the disaster represents a model of reality of the Earth's surface prior to the disaster. If the current target image 28 is acquired after the disaster, the system 10 and method 100 of the present invention will cause all changes between cloud-free image 26 and target image 28 to be detected, and, in some embodiments, will compute confidence measure 44 relative to those changes based on whether or not the change is caused by the presence of a cloud. In this case, some of the detected changes may be erroneously classified as due to clouds when, in fact, the change was caused by land cover changes in the Earth's surface due to the natural disaster. In other embodiments, the overall confidence measure 45 is computed 122 by system 10 and method 100 in part, by the currency of the cloud-free image 26 against which the target 28 is compared, with more current cloud-free images 26 leading to a higher overall confidence measure 45. It is apparent that if access to a more current cloud-free image 26 is provided, then operating in accordance with method 100, system 10 can be used to ensure that cloud-free image 26 more accurately reflects the model of reality of the Earth's surface, producing fewer false positives.

During the course of normal operations of the system 10 and method 100 of the present invention, a finite number of cloud-free images 26 will be acquired each day, and, in some embodiments, these cloud-free images 26 are committed to the cloud-free image database 20. In some embodiments, only those cloud-free images 20 meeting a specified cloud cover and confidence criteria are added to the cloud-free image database 20. Thus, over time, the cloud-free image database 20 may become more and more current and provide a more "realistic" model of reality of the actual Earth's surface. This is advantageous as the quality of the system cloud estimates gets better over time.

In some embodiments, prior to carrying out steps in method 100, a test is performed to determine whether the target image 28 was taken over snow, since snow may be easily confused with clouds. In some embodiments, global snow cover data is retrieved as a snow cover image in geo-referenced image format (e.g., GeoTIFF) in which color or brightness of the pixel value is indicative of the depth of the snow pack at the given geographic location. For example, NASA offers a snow cover dataset compiled from collections from both the Terra and MODIS satellites that is updated on a daily basis. In some instances, these maps have very low spatial resolution (250 m or larger) and, thus, pixel by pixel comparison to higher spatial resolution data is meaningless. Therefore, in some embodiments, the snow cover image is resized to match the same geographic area as target image 28. In some embodiments of system 10 and method 100, the resized snow cover image is reanalyzed to determine the average depth of the snow in the snow cover image. If the average depth of snow in the snow map is determined to be greater than a configurable threshold (in some embodiments, this threshold is zero, although in areas with year-round snow cover, this threshold may be slightly higher), then the target image 28 is considered to contain snow; otherwise, it is not considered to contain snow. If it is determined that the target image 28 was taken over snow, then, in some embodiments, method 100 steps are not applied, and standard machine learning techniques, such as SVM (Support Vector Machine), logistic regression, neural networks or decision trees, are utilized to identify clouds in the snow regions. If the test determines that target image 28 was not taken over snow, then, in some embodiments, the steps of method 100 are applied as generally discussed above. An embodiment of method 100 in which clouds in snow-covered regions are identified, is now discussed in more detail.

In one embodiment, a trained SVM model is used to distinguish snow from clouds in target image 28 with snow regions. In some embodiments, the SVM model analyzes panchromatic image data based on analyzing Haralick texture statistics. The SVM model is trained, in some embodiments, by selecting examples of cloudy pixels 30 and non-cloud pixels (including diverse land cover types such as water, vegetation, and snow) over different images collected at different times and different geographic areas. Applicant has determined that Haralick co-occurrence texture statistics offer good discrimination characteristics between cloudy pixels 30 and non-cloud pixels when the target image 28 is known to contain snow. In some embodiments, the SVM model is optimized using a standard grid search procedure.

Having trained the SVM model, in some embodiments of system 10 and method 100 of the present invention, target image 28 with snow cover is classified, as follows: First, target image 28 is converted to top-of-atmosphere reflectance using the formula in Equation 1 above. Haralick texture co-occurrence statistics are computed for the target image 28. The texture statistics are classified using the SVM model, and a probability that each pixel in the target image contains cloud is computed. Then the cloudy pixel mask image 46 for the target image 28 is determined through thresholding 120.

As demonstrated by the results contained in FIG. 9, the system 10 and method 100 of the present invention perform with fewer mistakes in identification of cloudy pixels 30 in target image 28 (e.g., panchromatic image). FIG. 9 shows a comparison of the performance of a prior art thresholding technique (e.g., prior art result image 64) to the results produced by application of method 100 by system 10 (e.g., cloud cover assessment image result 66) for target images 28 containing bright desert sand (FIG. 9 (A)); bright clouds on water over a sandy peninsula (FIG. 9 (B)); bright desert sand (FIG. 9 (C)); and, bright desert sand (FIG. 9 (D)). As shown in FIG. 9, regions shaded in Black indicate a True Negative; Fine Cross-Hatch, a True Positive; White, a False Positive; and, Fine Stipple, a False Negative. As is apparent by comparing the prior art result image 64 with the corresponding cloud cover assessment image result 66, the application of method 100 by system 10 makes many fewer mistakes on all Earth cover types than prior art techniques.

A further embodiment of method 100 is computer readable code or program instructions on one or more computer readable mediums capable of automatically carrying out the steps of method 100 discussed above. A computer readable medium is any data storage device that is capable of storing data, or capable of permitting stored data to be read by a computer system. Examples include hard disk drives (HDDs), flash memory cards, such as CF cards, SD cards, MS cards, and xD cards, network attached storage (NAS), read-only memory (ROM), random-access memory (RAM), CD-ROMs, CD-Rs, CD-RWs, DVDs, DVD-Rs, DVD-RWs, holographic storage mediums, magnetic tapes and other optical and non-optical data storage devices. The computer readable medium can also be in distributed fashion over multiple computer systems or devices which are coupled or otherwise networked together and capable of presenting a single view to a user of the medium.

A further embodiment is one or more computer systems or similar device configured to access computer readable code or program instructions from a computer readable medium and to execute program instructions using one or more CPUs to carry out embodiments of method 100 as previously described. Such computer system can be, but is not limited to, a typical personal computer, microcomputers, a handheld device such as a cell phone, PDA, BlackBerry, a network router, or a more advanced system such as a computer cluster, distributed computer system, server accessed over wired or wireless devices, a mainframe, a GPU cluster, or a supercomputer.

Thus, novel and improved methods and apparatus for reliably detecting clouds in the presence of remotely sensed imagery of the Earth from satellite or high altitude airborne platforms are disclosed. In some embodiments, system 10 works with imaging systems which collect data in a single spectral channel, with, for example, a broad bandwidth approximately covering the following wavelengths: 400 nm-900 nm. Embodiments also function on other regions of the electromagnetic spectrum. Those of ordinary skill in the art will appreciate that the various illustrative modules and steps described in connection with the embodiments disclosed herein may be implemented as electronic hardware, computer software, or combinations of both. To clearly illustrate this interchangeability of hardware and software, various illustrative components, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative components, modules, and steps described in connection with the embodiments disclosed herein may be implemented or performed with a general purpose processor, a digital signal processor ("DSP"), an application specific integrated circuit ("ASIC"), a Graphics Processing Unit ("GPU"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The components, modules, and steps described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a system base unit.

It is to be understood that the disclosure is not limited to the particular implementations or hardware architectures disclosed, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. Unless defined otherwise, all technical and scientific terms used herein have the same meaning as commonly understood by one of ordinary skill in the art to which the disclosure pertains. Although any methods and materials similar or equivalent to those described herein can be used in the practice for testing of the invention(s), specific examples of appropriate materials and methods are described herein.

The examples set forth above are provided to give those of ordinary skill in the art a complete disclosure and description of how to make and use the embodiments of the devices, systems and methods of the disclosure, and are not intended to limit the scope of what the inventors regard as their invention. Modifications of the above-described modes that are obvious to persons of skill in the art are intended to be within the scope of the following claims.

A number of embodiments have been described. Nevertheless, it will be understood that various modifications may be made without departing from the spirit and scope of the invention. Having herein set forth the various embodiments of the present invention, it is anticipated that suitable modifications can be made thereto which will nonetheless remain within the scope of the invention. The invention shall therefore only be construed in accordance with the following claims.

What is claimed is:

1. A computer-implemented method, comprising:
   receiving a panchromatic image;
   comparing the panchromatic image to a second image from a database of images, the second image having cloud-free regions;
   matching a first feature from the panchromatic image to a second feature from the second image, wherein the second feature is located in one of the cloud-free regions of the second image; and
   identifying a cloudy region in the panchromatic image based on the matching of the first feature to the second feature.

2. The method according to claim 1, wherein receiving the panchromatic image comprises receiving an image from a single spectral channel covering a broad wavelength range including at least a majority of the visible spectrum.

3. The method according to claim 2, wherein the broad wavelength range is about 400 nm to about 900 nm.

4. The method according to claim 1, wherein the panchromatic image has a resolution of at least 250 m.

5. The method according to claim 1, wherein the panchromatic image has a resolution of at least 15 m.

6. The method according to claim 1, wherein the database of images comprises panchromatic images having a broad wavelength range including at least a majority of the visible spectrum.

7. The method according to claim 6, wherein the broad wavelength range is about 400 nm to about 900 nm.

8. The method according to claim 1, wherein the database of images comprises images having resolutions lower than the resolution of the panchromatic image.

9. The method according to claim 1, wherein the database of images comprises images having resolutions of at least 250 m.

10. The method according to claim 1, wherein the database of images comprises images having resolutions of at least 15 m.

11. The method according to claim 1, further comprising automatically converting the panchromatic image to a top-of-atmosphere reflectance image.

12. The method according to claim 1, wherein the second image comprises a panchromatic image.

13. The method according to claim 1, wherein the identifying operation comprises:
   automatically determining a cloud presence probability value;
   calculating a confidence measure based on the cloud presence probability value; and
   determining if the confidence measure falls within a predetermined range that indicates a cloudy region in the panchromatic image.

14. The method according to claim 1, wherein the matching operation comprises using a normalized cross-correlation metric.

15. The method according to claim 1, further comprising converting the panchromatic image and the second image to a substantially similar brightness scale before matching the first feature from the panchromatic image to the second feature from the second image.

16. The method according to claim 1, wherein the first feature is a pixel in the panchromatic image and the second feature is a pixel in the second image.

17. A computer-implemented method, comprising:
   receiving a panchromatic image;
   identifying an area of interest in the image;
   automatically creating a first data set from the area of interest;
   receiving a second data set from a database, wherein the second data set includes data regarding one or more cloud-free regions of an image;
   comparing the first data set to the second data set to create a third data set; and
   identifying cloudy data points in the panchromatic image based on the third data set.

18. The method according to claim 17, further comprising adjusting the brightness scale of the panchromatic image before identifying an area of interest.

19. The method according to claim 17, wherein the comparing operation includes comparing a single pixel from the first data set to a single pixel in the second data set.

20. The method according to claim 17, wherein receiving the panchromatic image comprises receiving an image from a single spectral channel covering a broad wavelength range including at least a majority of the visible spectrum.

21. The method according to claim 20, wherein the broad wavelength range is about 400 nm to about 900 nm.

22. The method according to claim 17, wherein the database of images comprises panchromatic images having a broad wavelength range including at least a majority of the visible spectrum.

23. The method according to claim 22, wherein the broad wavelength range is about 400 nm to about 900 nm.

24. The method according to claim 17, further comprising automatically converting the panchromatic image to a top-of-atmosphere reflectance image.

25. The method according to claim 17, wherein the identifying operation comprises:

automatically determining a cloud presence probability value;
calculating a confidence measure based on the cloud presence probability value; and
determining if the confidence measure falls within a predetermined range that indicates a cloudy area in the panchromatic image.

26. The method according to claim 17, wherein the comparing operation comprises using a normalized cross-correlation metric.

27. A computer-implemented method, comprising:
receiving a first panchromatic image having a first set of pixels, wherein the first panchromatic image has a resolution of at least 15 m;
receiving a second panchromatic image from a database having a second set of pixels, wherein the second panchromatic image has a resolution of at least 15 m, wherein the second set of pixels is located in a cloud-free region of the second panchromatic image;
cross correlating the first set of pixels with the second set of pixels to create a cross-correlated set of pixels; and
identifying a cloudy region in the first panchromatic image from the cross-correlated set of pixels.

28. The method according to claim 27, wherein the identifying operation comprises:
automatically determining a cloud presence probability value for the cross-correlated set of pixels;
calculating a confidence measure based on the cloud presence probability value; and
determining if the confidence measure falls within a predetermined range that indicates a cloudy region in the first panchromatic image.

29. The method according to claim 27, wherein the cross correlating operation comprises using a normalized cross-correlation metric.

30. The method according to claim 29, wherein using the normalized cross-correlation metric comprises:
defining a search window in the first panchromatic image;
defining a reference window in the second panchromatic image;
computing a correlation value by calculating $$C(m, n) = \frac{(R(m, n) - \mu_R) \times (S(m, n) - \mu_S)}{\sqrt{(R(m, n) - \mu_R)^2 \times (S(m, n) - \mu_S)^2}}$$

where C (m, n) is the correlation value at location (m,n), R (m,n) is a reference window value at location (m,n), S (m,n) is a search window value at location (m,n), $\lambda_R$ is a mean of the reference window, and $\lambda_S$ is a mean of the search window, the correlation value being used to identify a cloudy region in the first panchromatic image.

31. The method according to claim 27, wherein the first set of pixels and the second set of pixels are cross-correlated on a pixel-by-pixel basis.

32. The method according to claim 27, further comprising automatically converting the panchromatic image to a top-of-atmosphere reflectance image.

33. The method according to claim 27, further comprising converting the first panchromatic image and the second panchromatic image to a substantially similar brightness scale.

* * * * *